United States Patent [19]

McCloskey

[11] 4,077,681
[45] Mar. 7, 1978

[54] SELF-ADJUSTING BEARING
[75] Inventor: Albert R. McCloskey, Fairfield, Conn.
[73] Assignee: Heim Universal Inc., Fairfield, Conn.
[21] Appl. No.: 569,836
[22] Filed: Apr. 21, 1975
[51] Int. Cl.² .................. F16C 9/06; F16C 23/04; F16C 25/04; F16C 43/02
[52] U.S. Cl. ............................ 308/72; 29/148.4 R; 308/238
[58] Field of Search ............... 29/148.4; 308/72, 238

[56] References Cited
U.S. PATENT DOCUMENTS

| | | | |
|---|---|---|---|
| 2,421,685 | 6/1947 | Crot et al. | 308/72 X |
| 2,478,056 | 8/1949 | Reeg | 308/72 |
| 2,675,283 | 4/1954 | Thomson | 308/238 |
| 3,089,221 | 5/1963 | Barr | 29/148.4 |
| 3,482,890 | 12/1969 | Burrell | 308/72 X |
| 3,510,178 | 5/1970 | Sowatzke | 308/72 |
| 3,655,249 | 4/1972 | Abel | 308/72 |

Primary Examiner—Robert J. Spar
Assistant Examiner—Howard Beltran
Attorney, Agent, or Firm—James C. Wray

[57] ABSTRACT

A spherical bearing assembly having an inner race member and an outer race member, the inner surface of the outer race member being a concave spherical surface, the outer surface of the inner member being a complementary convex spherical surface, the inner member including a spool member having a first threaded portion disposed on its outer surface and at least two spherical segments, each segment having a second threaded portion on its inner surface complementary to the said first threaded portion on the outer surface of the said spool member, the said segments disposed on and interlocked with the said spool member by the meshing of the said complementary first and second threaded portions, the said spool member's axial length is somewhat greater than the axial length of the said bore such that the said spool member, when threaded in a meshing relationship with the said spherical segments, a portion of the said threaded spool will extend beyond the lateral faces defined by the spherical segments, the said extension of the said spool member being adapted to receive a threaded nut-like member to further lock the said spool member and the said spherical segments in their respective operational positions, the improvement comprising the provision of a conical recess on the said nut member on the side thereof abutting the said spherical segments, the angle of the said conical surface of said recess being substantially tangential to the outer convex spherical surface of the said inner member.

6 Claims, 9 Drawing Figures

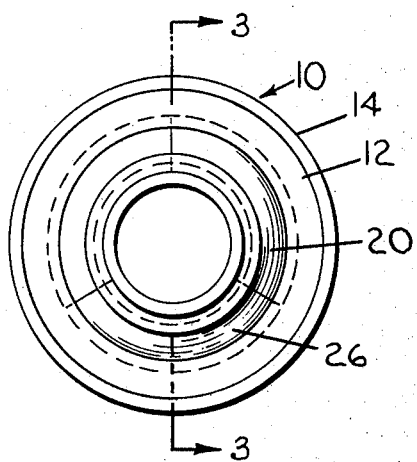
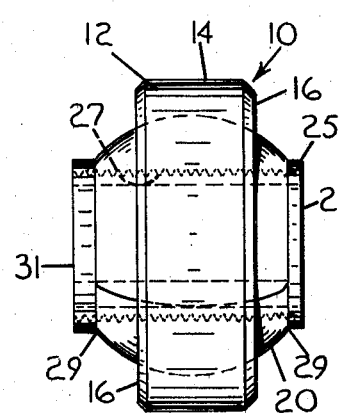
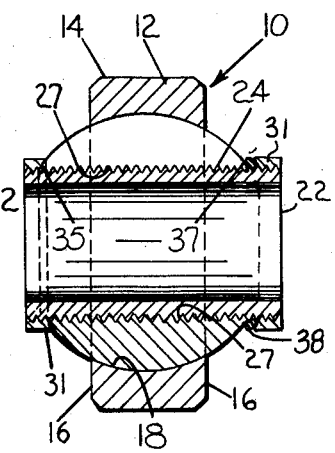
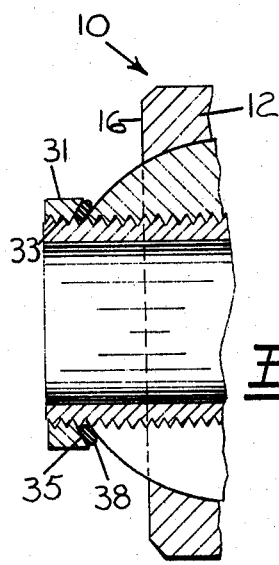
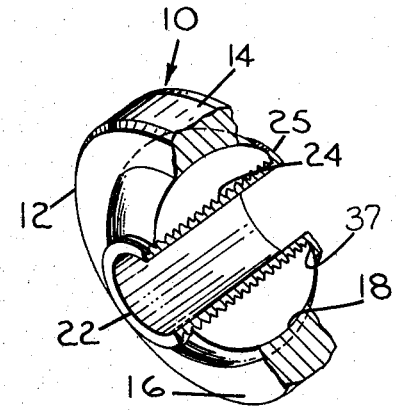
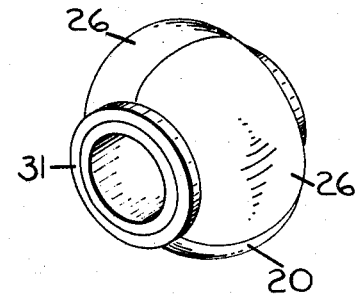
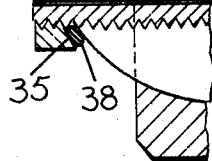
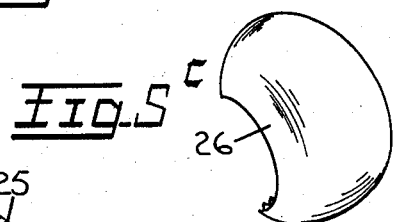
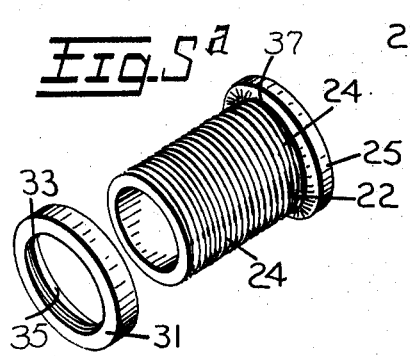
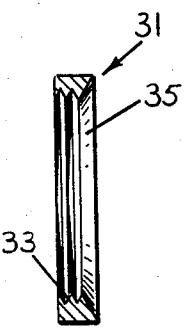

SELF-ADJUSTING BEARING

BACKGROUND OF THE INVENTION

The present invention, which comprises an improvement over my invention as set forth in my corresponding abandoned U.S. patent application Ser. No. 451,523 filed in U.S. Patent Office on Mar. 15, 1974, entitled "Spherical Bearing Assembly," relates generally to self-aligning bearings having a ball-like inner member with a convex outer surface and an outer member having an inner surface with a complementary concave spherical inner face. These types of bearings, which are commonly called "spherical bearings," have been utilized in industry for a substantial period of time. The technological evolution of these type bearings has been directed more in the terms of material composition of its various component parts rather than toward basic changes in design concepts. Accordingly, the design advances in spherical bearings have not been substantial in nature and thereby presently limiting their applications.

One area in which the spherical bearings have been extensively applied is the aircraft industry. This is due to the spherical bearing self-aligning characteristic. A typical such application is marrying of a spherical bearing to machine tool or to a landing gear strut or member of an airplane. In these types of applications the outer race is commonly press-fitted and/or staked into a housing or the like, rendering it difficult to remove and/or maintain. When any such maintenance is required, such as replacing of the ball, the entire bearing assembly including the inner and outer race member would have to be removed and replaced by an entirely new bearing assembly. Such an operation could entail substantial expense and down time of the entire machine tool or aircraft.

There are a number of prior art type spherical bearings which have been addressed to this kind of problem. One such type prior art bearing is the "messerschmidt" bearing. A concept of this bearing is that the ball can be removed in the field without disassembling the entire bearing, that is, removing the outer race member from its mounting. The messerschmidt type spherical bearing has proved somewhat unsatisfactory in that its overall bearing surface is decreased by the provision of a slot. This decrease or rather limited bearing surface area has a marked negative effect on the bearing performance characteristics.

SUMMARY OF THE INVENTION

A spherical bearing assembly having an inner race member and an outer race member, the inner surface of the outer race member being a concave spherical surface, the outer surface of the inner member being a complementary convex spherical surface, the inner member including a spool member having a first threaded portion disposed on its outer surface and at least two spherical segments, each segment having a second threaded portion on its inner surface complementary to said first threaded portion on the outer surface of said spool member, said segments disposed on and interlocked with said spool member by the meshing of said complementary first and second threaded portions, said spool member's axial length is somewhat greater than the axial length of said bore such that said spool member, when threaded in a meshing relationship with said spherical segments, a portion of said threaded spool will extend beyond the lateral faces defined by the spherical segments, said extension of said spool member being adapted to receive a threaded nut-like member to further lock said spool member and said spherical segments in their respective operational positions, the improvement comprising the provision of a conical recess on said nut member on the side thereof abutting said spherical segments, the angle of said conical surface of said recess being substantially tangential to the outer convex spherical surface of said inner member.

It is yet another object of the present invention to provide a spherical bearing assembly which is provided with a threaded spool member having integrally formed on one end thereof a hub portion, the hub portion adapted to abut the lateral face of the spherical segments of the inner race member.

It is still another object of the present invention to provide a spherical bearing assembly in which the concave inner surface is coated with a self-lubricating plastic such as "Teflon," a trademark of the DuPont Corporation.

It is yet another object of the present invention to provide a spherical bearing assembly in which the outer surface of said inner member as defined by the spherical segments are coated with self-lubricating plastic such as Teflon.

It is yet another object of the present invention to provide a spherical bearing assembly in which there are provided two of said nuts on each end of said spool member to retain said segments on said spool member.

It is yet another object of the present invention to provide a spherical bearing assembly wherein said spool member has a hub portion formed integrally on one end thereof, said hub portion having a conical recess on the side thereof abutting said spherical segments, the angle of the conical surface of said recess being substantially tangential to the outer convex spherical surface of said inner member.

It is yet another object of the present invention to provide a spherical bearing assembly wherein there is provided on the end of said spool member opposite said hub portion said nut member.

It is yet another object of the present invention to provide a spherical bearing assembly wherein there are provided two nut members on each end of said spool member each abutting said spherical segments.

It is yet another object of the invention to provide a spherical bearing assembly wherein an "O" ring member is provided in said conical recess between said segments and said nut member.

It is yet another object of the present invention to provide a spherical bearing assembly wherein an "O" ring member is provided in said conical recess between said segments and said hub portion.

Embodiments of the bearing according to the concept of the present invention are shown and/or described by way of example in the accompanying drawings and following description of the invention without attempting to show or describe all of the various forms and modifications in which the invention might be embodied; the invention being measured by the appended claims and not by the details of the specification.

DESCRIPTION OF THE DRAWINGS

FIG. 1 is a side elevational view of the spherical bearing assembly embodying the present invention with the longitudinal axis of the outer race member and the inner race member being substantially coincident;

FIG. 2 is a front partial phantom elevational view of the spherical bearing assembly in FIG. 1;

FIG. 3 is a front sectional view taken along line 3—3 of FIG. 1;

FIG. 4 is a perspective view of the inner race member alone in an assembled condition;

FIGS. 5a, 5b, 5c illustrate a perspective view of the component parts of the inner race member of FIG. 4;

FIG. 6 is a perspective sectional view of the spherical bearing of FIG. 1;

FIG. 7 is a sectional view of the nut member used in conjunction with the spherical assembly of FIG. 1;

FIG. 8 is a partial front sectional view of a spherical bearing embodying another form of the recent invention.

DESCRIPTION OF THE INVENTION

A spherical bearing embodying the concept of the present invention is generally indicated, as appropriate, by numeral 10 on the attached drawing as set forth in FIGS. 1 through 8, inclusive.

The bearing 10 has been shown as a spherical bearing, however, the present invention is also directly applicable to male or female rod end type bearings and the like.

The spherical bearing 10 comprises an outer race member 12 which may be provided with an outer cylindrical surface 14. The outer member 10 may also be provided with two annular faces 16. The outer race member 12 is further provided with a concave spherical inner surface 18. It may be noted at this juncture that the outer race member 12 may be similar to the outer race members as found in the prior art.

The basic thrust of the present invention is to be found in the inner race member 20 hereafter referred to as the inner member which is typically formed, in the prior art, as a single solid member. The inner member 20 as distinguished from the inner members of the prior art is a composite member having several parts and, in particular, to a below described nut member. The basic part or member is a threaded spool member 22. The spool member 22 may be characterized as a spool member having a threaded outer surface 24. The threads on the spool member 22 may be formed in helical fashion and may be selected from a number of different types of threads as found in typical mechanical engineering handbook, as, for example, MARK'S STANDARD HANDBOOK FOR MECHANICAL ENGINEERS, Seventh Edition, Section 8, MACHINE ELEMENTS. The spool member 22 may be formed with or without an integral hub portion 25 whose purpose and function will be explained in further detail below.

The inner member 20 is also provided with at least two spherical segments 26. As can be seen from the various figures, the spherical segments 26 which are three in number when placed within the outer race member 12 in an abutting relationship form the bearing portion of the inner member 20. The three spherical segments 26 are provided with a threaded inner surface 27. The threaded inner surface 27 of the spherical segments 26 provide a complementary threaded bore complementary to the threaded outer surface of the spool member 22. The threaded bore formed by the inner surface of the spherical segments 26 may be analogized to the nut of a nut and bolt arrangement, the bolt being the spool and, in particular, the threaded outer surface of said spool member 22.

Accordingly, it can be seen that the spherical segments 26 can be placed in abutting relationship within the outer member 12 and the spool member 22 may be threaded in a meshing relationship within the central bore as defined by the assembled spherical bearing segments 26. When the spool member 22 is fully threaded into meshing relationship with the spherical segments, it can be further seen that the spherical segments 26 are thereby maintained in a fixed operational relationship with respect to the spool member 22. This mechanical interlocking relationship of the threaded inner surface of the spherical segments 26 and the threaded outer surface of the spool member 22 acts to maintain the overall operational integrity of the spherical bearing 10.

As before mentioned, the basic thrust of the present invention is to be found in composite structure of the inner member 20 and, in particular, to a nut member 31. The spherical segments of the above noted U.S. patent application Ser. No. 451,523 were provided with lateral faces which abutted a nut member and/or hub portion formed on the spool member. In the present invention, the spherical segments 26 have a uniform outer surface which terminate at their respective threaded portions. The nut member 31 is adapted to be threadably engaged and intermeshed with the threaded portion of the spool member 22 that extends beyond the spherical segments 26. This nut-like member 31 may be generally characterized as a "lock nut" and is provided with a threaded inner surface 33 complementary to the threaded outer surface of the spool member 22. The nut member or ring 31 is provided with a conical recess 35 which is adapted to abut the spherical segments 26 when the nut member of ring 31 is threaded upon the spool 22. The angle of the conical surface of the recess 35 is formed at an angle substantially tangential to the outer convex spherical surface of the inner member defined by the outer surfaces of the various spherical segments 26. The provision of the conical recess 35 is important in that it enables the nut member 31 to be brought into positive interlocking relationship with the spherical segments threadably disposed on the spool member 22. This "snug" fit of the ring or member 31 with the spherical segments may be further enhanced by the provision of an annular "O" ring 38 disposed in the conical recess 35. The provision of such an "O"ring member will cause reaction forces to be exerted against the various spherical segments 26 and the nut member 31.

The spool member 22 may also be provided with an integrally formed hub portion 25. The hub portion 25 may also be provided with a conical recess 37 on the side abutting the various spherical segments 26. The angle of the conical surface of the recess 37 is substantially tangential to the outer convex spherical surface of the inner member 20. As with the above mentioned nut member 31, an "O" ring (not shown) may also be provided to be fitted within the conical recess 37 (FIGS. 5a, 5b, and 6) in the hub portion 25 for the same reasons.

The spool member 22 may also be sized to threadably accommodate a nut member 31, one such nut member 31 at each end thereof to interlock the spherical segments 26 on the spool member. Furthermore, the spool member may be configured to receive a single nut member at one end and be provided with a hub portion 25 at its other end.

The outer surface of the ring 31 as well as the outer peripheral portion of the hub 25 may be provided with a nut-like structure or knurled structure (neither shown) for the ready application of a tool such as a wrench which will aid and assist the threading of the various parts into mechanical interlocking relationship.

The outer surface of the ring 31 may also be provided with suitable spanner holes (not shown) which may be engaged by an appropriate spanner ring or the like for threading the ring 31 on the hub 25.

It should be noted that the spool member 22 of FIG. 6 is shown only with the hub portion 25, while FIGS. 1 to 5 show the threaded application of the ring 31 to the spool member 22. Further, the spool member could be formed without the hub portion 25 (not shown). It can be seen, therefore, that the inner member can be completely dismantled and removed from the outer member 12 without dislodging or otherwise interfering with the position or the condition of the outer member with respect to its mounting surface (not shown). This feature becomes particularly important when the outer face member is fixedly attached to some structural surface such as by press-fit or the like. For example, in an aircraft or machine tool type application, a new inner member may be inserted quickly and efficiently without disturbing any other part of the aircraft or machine tool except that part which is directly attached to the inner member 20 thereby avoiding costly down time expenses.

An additional very important feature of the present invention is that the inner member can be sized by varying the dimension of the convex outer surface as defined by the segments 26. By varying this dimension certain bearing wear, which may be experienced by the inner concave surface of the outer member 12, can be accommodated, thereby maintaining the overall bearing tolerance of the bearing assembly 10.

It is to be noted that threaded portion 24 depicted in the drawings as being disposed throughout the entire outer surface of the spool member 22 while the complementary threaded portion 27 is disposed throughout the entire inner surface of the spherical segments. The respective threaded areas could, of course, cover only a partial portion of the inner surface of the spherical segments 26 and the outer surface of the spool member 22. The axial position of the various threaded portions could also be changed from the central position.

It should be noted that the outer spherical surface of the spherical segments 26 and/or the inner concave surface of the outer race member 12 could be coated with a self-lubricating plastic such as Teflon.

As before mentioned, the present invention provides a marked improvement in the ability to service spherical bearings in the field without displacing or otherwise dislodging the outer race member. This is accomplished without any compromise in the bearing performance or characteristic such as a reduction in the overall bearing surface which is typified by the prior art bearings such as the messerschmidt type ball spherical bearing.

From the above description of the invention along with various figures as set forth in the drawings it will be readily seen and appreciated that a spherical bearing embodying the concept of the present invention will positively and effectively accomplish the objectives of the invention. The above-noted embodiment is shown by way of example without attempting to show all the various forms and modifications in which the invention might be embodied; the invention being measured by the appended claims and not the specific details of the specification.

I claim:

1. A spherical bearing assembly having an inner race member and an outer race member, the inner surface of the outer race member being a concave spherical surface, the outer surface of the inner member being a complementary convex spherical surface, the inner member including a spool member having a first threaded portion disposed on its outer surface and at least two spherical segments, each segment having a second threaded portion on its inner surface complementary to said first threaded portion on the outer surface of said spool member, said segments disposed on and interlocked with said spool member by the meshing of said complementary first and second threaded portions, said spool member's axial length is somewhat greater than the axial length of said bore such that said spool member, when threaded in a meshing relationship with said spherical segments, a portion of said threaded spool will extend beyond the lateral faces defined by the spherical segments, said extension of said spool member being adapted to receive a threaded nut-like member to further lock said spool member and said spherical segments in their respective operational position, the improvement comprising the provision of a conical recess on said nut member on the side thereof abutting said spherical segments, the angle of said conical surface of said recess being substantially tangential to the outer convex spherical surface of said inner member, whereby the conical surface radially and longitudinally inwardly grips the segments and holds the segments aligned with each other and in tight inward relationship on the spool member independent of the outer member.

2. A spherical bearing assembly in accordance with claim 1 wherein there are provided two of said nuts one on each end of said spool member to retain said segments on said spool member.

3. A spherical bearing assembly in accordance with claim 1 wherein said spool member has a hub portion formed integrally on one end thereof, said hub portion having a conical recess on the side thereof abutting said spherical segments, the angle of the conical surface of said recess being substantially tangential to the outer convex spherical surface of said inner member.

4. A spherical bearing assembly in accordance with claim 3 wherein there is provided on the end of said spool member opposite said hub portion said nut member.

5. A spherical bearing assembly in accordance with claim 3 wherein an "O" ring member is provided in said conical recess between said segments and said hub portion.

6. A spherical bearing assembly in accordance with claim 1 wherein an "O" ring member is provided in said conical recess between said segments and said nut member.

* * * * *